United States Patent
Hunt (10) Patent No.: US 10,841,483 B1
(45) Date of Patent: Nov. 17, 2020

(54) SYSTEM AND METHOD FOR CALIBRATING AT LEAST ONE CAMERA AND A LIGHT DETECTION AND RANGING SENSOR

(71) Applicants: Denso International America, Inc., Southfield, MI (US); Denso Corporation, Kariya (JP)

(72) Inventor: Shawn Hunt, Pinckney, MI (US)

(73) Assignees: Denso International America, Inc., Southfield, MI (US); Denso Corporation, Kariya (JP)

( * ) Notice: Subject to any disclaimer, the term of this patent is extended or adjusted under 35 U.S.C. 154(b) by 0 days.

(21) Appl. No.: 16/508,592

(22) Filed: Jul. 11, 2019

(51) Int. Cl.
*H04N 5/232* (2006.01)
*G06T 7/13* (2017.01)
(Continued)

(52) U.S. Cl.
CPC ....... *H04N 5/23216* (2013.01); *G01S 7/4972* (2013.01); *G01S 7/51* (2013.01);
(Continued)

(58) Field of Classification Search
CPC ... H04N 5/23216; G01S 17/931; G01S 17/86; G01S 7/51; G01S 17/89; G01S 17/42;
(Continued)

(56) References Cited

U.S. PATENT DOCUMENTS 7,605,817 B2 * 10/2009 Zhang ..................... G06T 7/285
345/473
9,201,424 B1 * 12/2015 Ogale ....................... G06T 7/80
(Continued)

FOREIGN PATENT DOCUMENTS

WO  2019025035 A1  2/2019

OTHER PUBLICATIONS

Pandey et al., "Automatic Targetless Extrinsic Calibration of a 3D Lidar and Camera by Maximizing Mutual Information," Proceedings of the Twenty-Sixth AAAI Conference on Artificial Intelligence, pp. 2053-2059 (2012).
(Continued)

*Primary Examiner* — Chiawei Chen
(74) *Attorney, Agent, or Firm* — Christopher G. Darrow; Darrow Mustafa PC (57) ABSTRACT

A system for calibrating at least one camera and a light detection and ranging ("LiDAR") sensor includes one or more processors and a memory in communication with the one or more processors that stores an initial calibration module and a user calibration module. The initial calibration module includes instructions that cause the one or more processors to obtain a camera image from the at least one camera, determine when the camera image includes at least one object having at least one edge, obtain a three-dimensional point cloud image from the LiDAR sensor that includes the at least one object having at least one edge and generate a combined image, that includes at least portions of the camera image and at least portions of the three-dimensional point cloud image. The user calibration module includes instructions that cause the one or more processors to display the combined image on a display, receive at least one input from a user interface, and adjust a calibration parameter of at least one of the LiDAR sensor and the at least one camera in response to the one or more inputs from the user interface.

18 Claims, 4 Drawing Sheets

(51) Int. Cl.
*G06T 7/33* (2017.01)
*G06F 3/0484* (2013.01)
*G06T 3/20* (2006.01)
*G06T 3/00* (2006.01)
*G01S 17/42* (2006.01)
*G01S 7/51* (2006.01)
*G01S 7/497* (2006.01)
*G01S 17/89* (2020.01)
*G06T 7/80* (2017.01)
*G01S 17/86* (2020.01)
*G01S 17/931* (2020.01)

(52) U.S. Cl.
CPC .............. *G01S 17/42* (2013.01); *G01S 17/86* (2020.01); *G01S 17/89* (2013.01); *G01S 17/931* (2020.01); *G06F 3/04845* (2013.01); *G06T 3/0068* (2013.01); *G06T 3/20* (2013.01); *G06T 7/13* (2017.01); *G06T 7/33* (2017.01); *G06T 7/80* (2017.01); *G06T 2200/24* (2013.01); *G06T 2207/10028* (2013.01); *G06T 2207/20092* (2013.01); *G06T 2207/20212* (2013.01); *G06T 2207/30252* (2013.01)

(58) Field of Classification Search
CPC . G01S 7/4972; G06T 7/80; G06T 3/20; G06T 3/0068; G06T 7/13; G06T 7/33; G06T 2207/30252; G06T 2207/20212; G06T 2200/24; G06T 2207/20092; G06T 2207/10028; G06F 3/04845
See application file for complete search history.

(56) References Cited

U.S. PATENT DOCUMENTS

| | | | | |
|---|---|---|---|---|
| 9,916,703 | B2* | 3/2018 | Levinson | G06Q 10/06 |
| 10,176,596 | B1* | 1/2019 | Mou | G06T 7/80 |
| 10,223,806 | B1 | 3/2019 | Luo et al. | |
| 2007/0031064 | A1* | 2/2007 | Zhao | G06T 7/33 |
| | | | | 382/285 |
| 2008/0112610 | A1* | 5/2008 | Israelsen | G06T 17/00 |
| | | | | 382/154 |
| 2010/0157280 | A1* | 6/2010 | Kusevic | G01S 7/4972 |
| | | | | 356/4.01 |
| 2011/0286660 | A1* | 11/2011 | Ofek | G06T 19/20 |
| | | | | 382/154 |
| 2012/0290169 | A1* | 11/2012 | Zeng | G01S 7/4026 |
| | | | | 701/30.2 |
| 2014/0132723 | A1* | 5/2014 | More | G01S 7/497 |
| | | | | 348/46 |
| 2014/0207420 | A1* | 7/2014 | Edwards | G06T 17/00 |
| | | | | 703/1 |
| 2014/0240690 | A1* | 8/2014 | Newman | G01S 17/87 |
| | | | | 356/4.01 |
| 2015/0317781 | A1* | 11/2015 | Napier | G01S 17/86 |
| | | | | 348/46 |
| 2016/0098858 | A1* | 4/2016 | Patkar | G06T 7/593 |
| | | | | 345/420 |
| 2016/0140744 | A1* | 5/2016 | Strelow | G06T 11/60 |
| | | | | 382/284 |
| 2016/0227181 | A1* | 8/2016 | Ilic | G06K 9/18 |
| 2017/0061632 | A1* | 3/2017 | Lindner | G01S 7/4972 |
| 2017/0124781 | A1* | 5/2017 | Douillard | G08G 1/202 |
| 2017/0228940 | A1* | 8/2017 | Kutliroff | G06T 7/12 |
| 2017/0287225 | A1* | 10/2017 | Powderly | G06T 19/006 |
| 2017/0372527 | A1* | 12/2017 | Murali | G01S 17/48 |
| 2018/0053347 | A1* | 2/2018 | Fathi | G06T 17/205 |
| 2018/0130234 | A1* | 5/2018 | Barker | G06T 7/0006 |
| 2018/0308254 | A1* | 10/2018 | Fu | G06T 7/80 |
| 2018/0356526 | A1* | 12/2018 | Wang | G01S 17/86 |
| 2019/0120946 | A1 | 4/2019 | Wheeler et al. | |
| 2019/0353784 | A1* | 11/2019 | Toledano | G01S 17/86 |
| 2019/0392562 | A1* | 12/2019 | Othon | G06T 5/003 |
| 2020/0096613 | A1* | 3/2020 | Li | G01S 17/00 |

OTHER PUBLICATIONS

Geiger et al., "Automatic Camera and Range Sensor Calibration using a Single Shot," 2012 IEEE International Conference on Robotics and AUtomation, 8 pages (2012).

* cited by examiner

SYSTEM AND METHOD FOR CALIBRATING AT LEAST ONE CAMERA AND A LIGHT DETECTION AND RANGING SENSOR

TECHNICAL FIELD

The subject matter described herein relates, in general, to a system and method for calibrating at least one camera and a light detection and ranging ("LiDAR") sensor.

BACKGROUND

The background description provided is to present the context of the disclosure generally. Work of the inventor, to the extent it may be described in this background section, and aspects of the description that may not otherwise qualify as prior art at the time of filing, are neither expressly nor impliedly admitted as prior art against the present technology.

Some vehicles, especially autonomous vehicles, are equipped with numerous sensors to detect the presence of external objects. The sensors may include one or more cameras that are capable of capturing two-dimensional images of the surrounding environment. In addition, the sensors may include a LiDAR sensor that is capable of capturing a three-dimensional point cloud image. In order for systems to correctly interpret data from the camera and the LiDAR sensor, the camera in the LiDAR sensor must be calibrated such that they are capturing the same or similar field of view.

Some cameras and LiDAR sensors are calibrated by using a known target, such as a checkerboard. Other cameras and LiDAR sensors are calibrated without the need of a target and rely on detecting objects in the environment and attempting to calibrate the cameras and LiDAR sensors based on the detected objects. Because of the tedious nature of calibrating the camera in the LiDAR sensor, the calibration of the camera in the LiDAR sensor may be performed at a factory.

SUMMARY

This section generally summarizes the disclosure and is not a comprehensive explanation of its full scope or all its features.

In one embodiment, a method for calibrating at least one camera and a LiDAR sensor includes obtaining a camera image from the at least one camera, determining when the camera image includes at least one object having at least one edge, obtaining a three-dimensional point cloud image from the LiDAR sensor that includes the at least one object having at least one edge, generating a combined image that includes at least portions of the camera image and at least portions of the three-dimensional point cloud image, displaying the combined image on a display, receiving at least one input from a user interface that moves at least one of the three-dimensional point cloud image and the camera image of the combined image displayed in the display, and adjusting a calibration parameter of at least one of the LiDAR sensor and the at least one camera in response to the one or more inputs from the user interface.

In another embodiment, a system for calibrating at least one camera and a LiDAR sensor includes one or more processors and a memory in communication with the one or more processors that stores an initial calibration module and a user calibration module. The initial calibration module includes instructions that cause the one or more processors to obtain a camera image from the at least one camera, determine when the camera image includes at least one object having at least one edge, obtain a three-dimensional point cloud image from the LiDAR sensor that includes the at least one object having at least one edge and generate a combined image, that includes at least portions of the camera image and at least portions of the three-dimensional point cloud image. The user calibration module includes instructions that cause the one or more processors to display the combined image on a display, receive at least one input from a user interface, and adjust a calibration parameter of at least one of the LiDAR sensor and the at least one camera in response to the one or more inputs from the user interface.

In yet another embodiment, a non-transitory computer-readable medium for calibrating at least one camera and a LiDAR sensor and includes instructions that when executed by one or more processors cause the one or more processors to: obtain a camera image from the at least one camera, determine when the camera image includes at least one object having at least one edge, obtain a three-dimensional point cloud image from the LiDAR sensor that includes the at least one object having at least one edge, generate a combined image that includes at least portions of the camera image and at least portions of the three-dimensional point cloud image, display the combined image on a display, receiving at least one input from a user interface that moves at least one of the three-dimensional point cloud image and the camera image of the combined image displayed in the display, and adjust a calibration parameter of at least one of the LiDAR sensor and the at least one camera in response to the one or more inputs from the user interface.

Further areas of applicability and various methods of enhancing the disclosed technology will become apparent from the description provided. The description and specific examples in this summary are intended for illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

A system and method for calibrating at least one camera and a LiDAR sensor includes one or more processors and a memory device that stores an initial calibration module and a user calibration module. The initial calibration module causes the one or more processors to obtain a camera image from the camera and a three-dimensional point cloud image from the LiDAR sensor. These images are then combined to form a combined image.

The combined image is displayed on a display device to allow a user to see if the camera image and the three-dimensional point cloud image match correctly in the combined image. The user, via a user interface, can move the camera image and/or the three-dimensional point cloud image to fine-tune the positioning of these images so they match. Once this is accomplished, the inputs the user provided by the user interface are then utilized to adjust the calibration parameters of the at least one camera and/or the LiDAR sensor.

Figure 1:
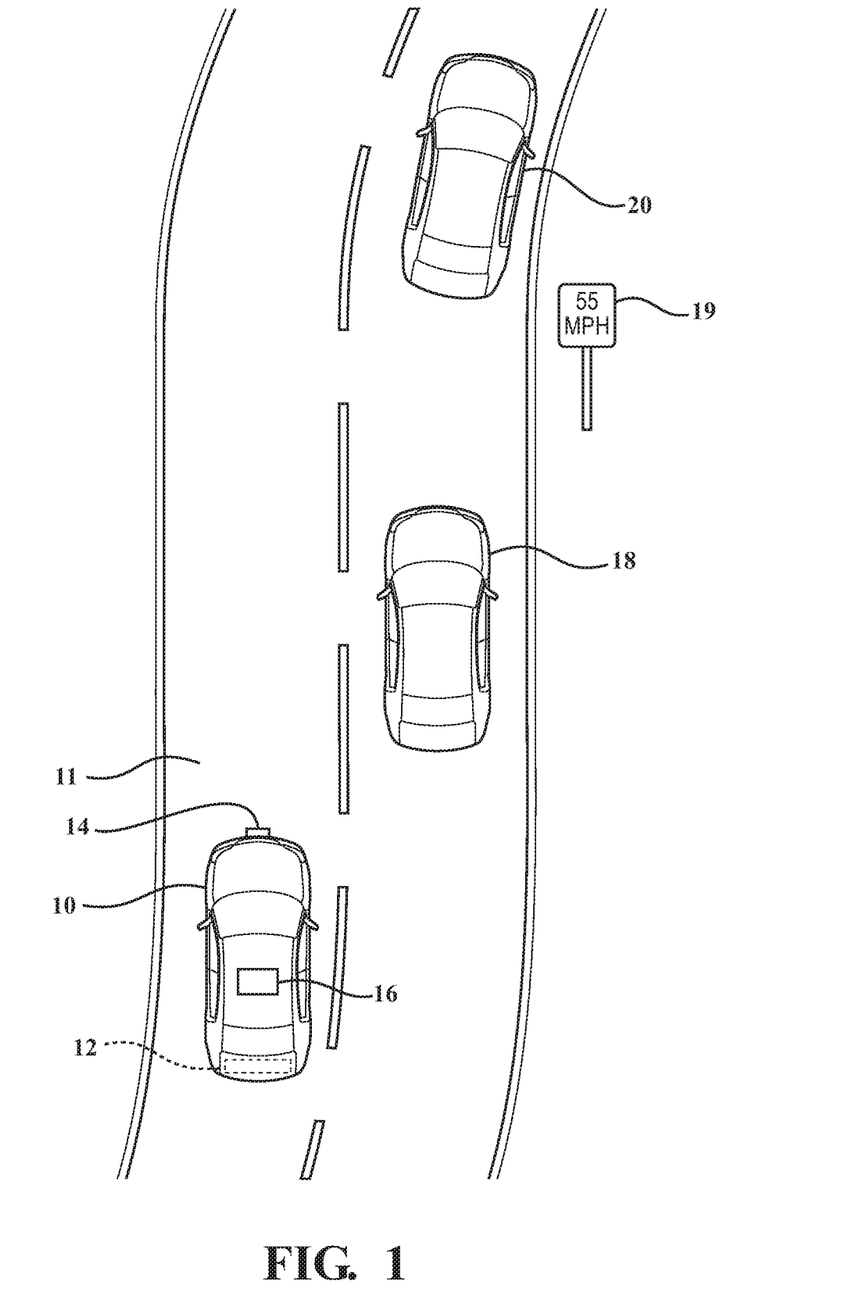
FIG. 1 illustrates an example of a vehicle equipped with a system for calibrating at least one camera and a LiDAR sensor.

Referring to FIG. 1, a vehicle 10 traveling down a roadway 11 is shown. The vehicle 10 includes a system 12 for calibrating a camera 14 and a LiDAR sensor 16 mounted to the vehicle 10. The vehicle 10 may be any one of a number of different types of vehicles capable of transporting persons or items from one location to another. In the example shown in FIG. 1, the vehicle 10 is in the form of an automobile. However, the vehicle 10 may take any one of several different forms, such as a truck, heavy-duty truck, tractor-trailer, tractor, mining vehicle, military vehicle, and the like. In addition, the vehicle 10 may not be limited to ground-based vehicles but could also include aircraft and seagoing vessels as well.

As will be explained in greater detail later in this specification, the vehicle 10 utilizes the camera 14 and the LiDAR sensor 16 to detect objects, such as other vehicles like vehicles 18 and 20, roadway signs 19, animals, pedestrians, or any kind of object. The vehicle 10 may be a semi-autonomous or autonomous vehicle that may utilize data collected from the camera 14 and/or the LiDAR sensor 16 so as to safely pilot the vehicle to a destination and/or take corrective action so as to prevent the vehicle 10 from colliding with other objects, such as the vehicles 18 and 20.

As such, the data collected on the camera 14 and the LiDAR sensor 16 should be reliable and useful. In order to achieve this, the camera 14 and the LiDAR sensor 16 should be calibrated with each other. The camera 14 and the LiDAR sensor 16 provide complementary information of the environment. The camera 14 may be able to capture two-dimensional images that could include the color, texture, and appearance of objects located within the field of view of the camera 14. The LiDAR sensor 16 may be able to detect the three-dimensional structural information of the objects in the environment. As such, calibration parameters such as the rotation and translation of the camera 14 with respect to the LiDAR sensor 16 or vice versa may be useful to fuse data received from the camera 14 and the LiDAR sensor 16, so they can be used by other vehicle systems.

Figure 2:
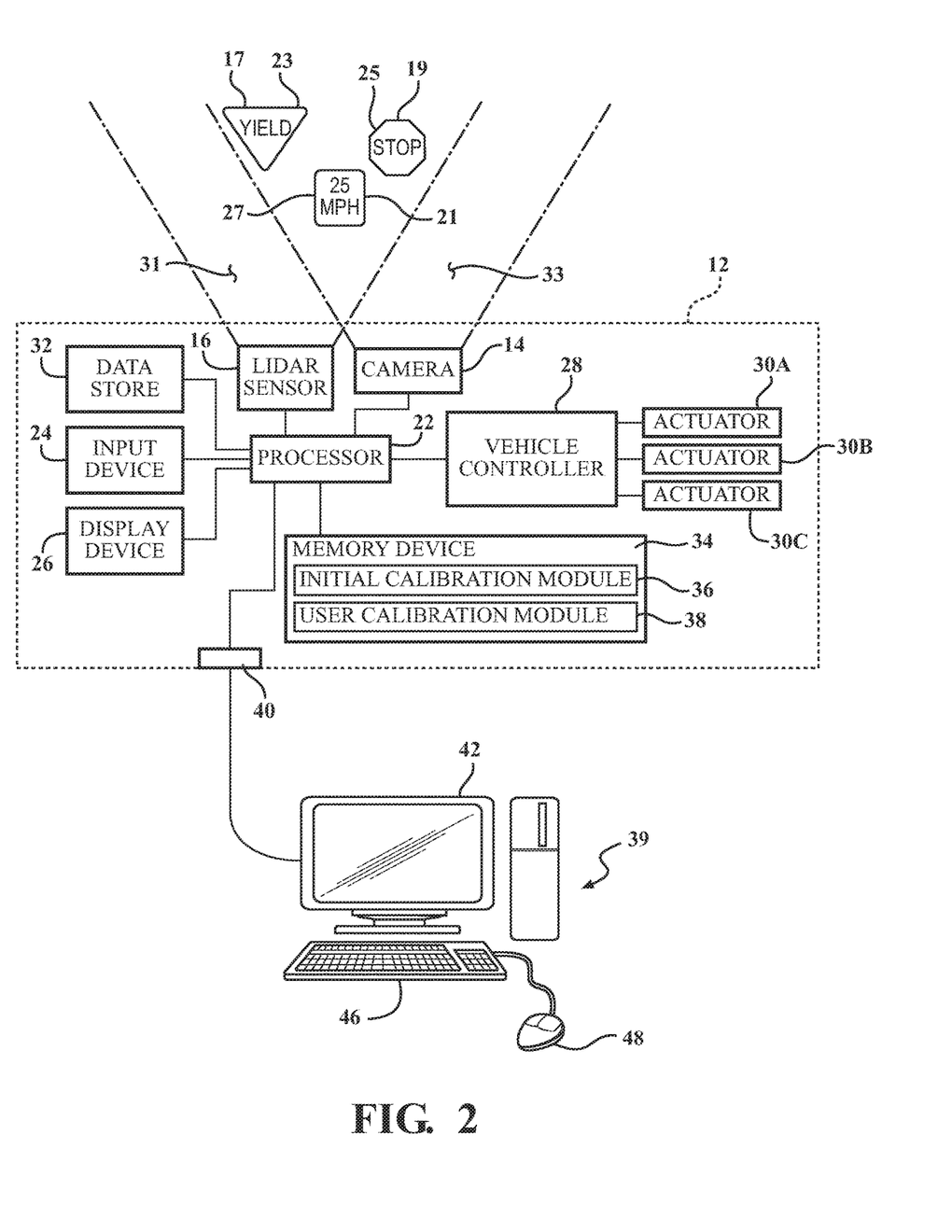
FIG. 2 is a more detailed block diagram of the system for calibrating at least one camera and a LiDAR sensor.

Referring to FIG. 2, a more detailed illustration of the system 12 is shown. At the outset, it should be understood that while the system 12 has been previously described as being located within the vehicle 10, it should be understood that the system 12 does not necessarily need to be located within a vehicle. Furthermore, it should be understood that the system 12 does not necessarily need to be utilized in vehicle applications. As such, the system 12 could be used in a variety of different applications that may require the calibration of at least one camera in a LiDAR sensor.

The system 12 may include one or more processors 22 in communication with a camera 14, a LiDAR sensor 16, an input device 24, a display device 26, a vehicle controller 28, a data store 32, and a memory device 34. The LiDAR sensor 16 may be a single LiDAR sensor or may be multiple LiDAR sensors. The LiDAR sensor 16 may have any one of several different components, such as lasers, scanners, optics, photodetectors, receiver electronics, and navigation and positioning systems. The LiDAR sensor 16 may utilize any one of several different detection methodologies. For example, the LiDAR sensor 16 may utilize either direct energy detection and/or coherent detection.

The LiDAR sensor 16 is configured to survey a scene in the environment and generate a three-dimensional point cloud image. For example, the LiDAR sensor 16 may have a field-of-view 31 that includes road signs 17, 19, and 21 having edges 23, 25, and 27, respectively. The LiDAR sensor 16 can survey the environment that includes the road signs 17, 19, and 21 and generate a three-dimensional point cloud image of the environment and any of the objects, such as road signs 17, 19, and 21 located within the field-of-view 31. The three-dimensional point cloud image may be provided to the one or more processors 22.

The camera 14 may be a single camera or may include multiple cameras. For example, the camera 14 may be a stereoscopic camera. The camera 14 may have a field-of-view 33 that includes road signs 17, 19, and 21 having edges 23, 25, and 27, respectively. The camera 14 can survey the environment that includes the road signs 17, 19, 21 and generate a camera image of the environment and any of the objects, such as road signs 17, 19, and 21 located within the field-of-view 33. The camera image may be a two-dimensional image.

The input device 24 may be any type of device that allows the user to provide information to the one or more processors 22 of the system 12. As such, the input device 24 may be a touchscreen and/or keyboard that allows the user to provide information to the one or more processors 22. In one example, the input device 24 may be a touchscreen located within the interior of a vehicle, such as the vehicle 10 of FIG. 1.

The display device 26 may be any type of device that allows the user to receive visual information from the one or more processors 22 of the system 12. This information could include the camera image captured by the camera 14 and/or the three-dimensional point cloud image captured by the LiDAR sensor 16. As will be explained later, the information could also include a combined image that includes portions of the camera image and three-dimensional point cloud image. Additionally, it should be understood that the display device 26 and the input device 24 may be incorporated as a touchscreen that allows for inputting information from the driver as well as displaying information to the user. The display device 26 could be incorporated within the interior of the vehicle, such as vehicle 10 of FIG. 1.

The system 12 may also include a vehicle controller 28. However, the system 12 may be utilized in several different applications and is not just limited to vehicles. As such, the system 12 may not include the vehicle controller 28, especially when utilized in applications that are not vehicle-related.

The vehicle controller 28 may be a controller that is capable of controlling the vehicle using one or more actuators 30A, 30B, and/or 30C. For example, the actuator 30A may be able to control the throttle of the vehicle, the actuator 30B may be able to control the braking system of the vehicle, and the actuator 30C may be able to control the steering system of the vehicle. The vehicle controller 28 may be able to provide semi-autonomous and/or active safety assistance to the driver to prevent the vehicle from colliding with other objects. The vehicle controller 28 could also provide autonomous driving capabilities to the vehicle, which may allow the vehicle to pilot itself with minimal or no driver input.

The data store 32 may store one or more types of data. The data store 32 can include volatile and/or non-volatile memory. Examples of suitable data stores 32 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 32 can be a component of the one or more processors 22 or the data store 32 can be operatively connected to the one or more processors 22 for use thereby. The term "operatively connected," as used throughout this description, can include direct or indirect connections, including connections without direct physical contact. For example, the data store 32 may store calibration parameters for the camera 14 and/or the LiDAR sensor 16.

The memory device 34 may be any type of memory capable of storing information that can be utilized by the one or more processors 22. As such, the memory device 34 may include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. In this example, the memory device 34 is separate from the one or more processors 22, but it should be understood that the memory device 34 may be incorporated within any of the one or more processors 22, as opposed to being a separate device.

The memory device 34 may be capable of storing one or more modules that when executed by the one or more processors 22 cause the one or more processors 22 to perform any one of several different methods disclosed in this disclosure. In this example, the memory device 34 includes an initial calibration module 36 and a user calibration module 38.

The initial calibration module 36 includes instructions that when executed by the one or more processors 22 cause the one or more processors 22 to perform several different functions. These functions include obtaining a camera image from the a camera 14. In this example, the camera image could include the field-of-view 33 that includes signs 17, 19, and 21.

The initial calibration module 36 also includes instructions that cause the one or more processors 22 to determine when the camera image includes at least one object having at least one edge. In this example, the processor 22 can determine the presence of the road signs 17, 19, and 21. The initial calibration module 36 may configure the one or more processors 22 also to determine if the camera image includes the edges 23, 25, and 27 of the road signs 17, 19, and 21, respectively. It should be understood that the initial calibration module 36 may include instructions to require a specific number or a minimal number of objects to be present in the camera image. As such, while only one object may be necessary, the initial calibration module 36 could include instructions requiring at least three objects with edges be detected in the camera image.

The initial calibration module 36 includes instructions that cause the one or more processors 22 to obtain a three-dimensional point cloud image from the LiDAR sensor 16. The three-dimensional point cloud image may include the one or more objects previously captured in the camera image. Here, in this example, the objects may include road signs 17, 19, and 21 having edges 23, 25, and 27, respectively.

The initial calibration module 36 may also include instructions that cause the one or more processors 22 to generate a combined image that includes at least portions of the camera image in at least portions of the three-dimensional point cloud image. The combined image may be such that the camera image is projected onto the three-dimensional point cloud image and/or that the three-dimensional point cloud image is projected onto the camera image.

The initial calibration module 36 may also include instructions to determine if the camera image and/or the three-dimensional point cloud image have the appropriate data making it possible to generate the combined image. For example, the initial calibration module 36 may include instructions that enable the one or more processors 22 to count the number of objects in the camera image and count the number of objects in the three-dimensional point cloud image. If the number of objects in the three-dimensional point cloud image and the camera image are the same, the initial calibration module 36 may then generate the combined image. It should be understood that this may be an optional step. Furthermore, there may be any one of several different methodologies that may be utilized to determine that the appropriate data has been captured in the camera image and/or the three-dimensional point cloud image.

The initial calibration module 36 may also include instructions that cause the one or more processors 22 to move the camera image and/or the three-dimensional point cloud image so that the edges 23, 25, and 27 of the road signs 17, 19, and 21, respectively, captured in the camera image and the three-dimensional point cloud image substantially aligned. Based on the movement of the camera image and/or to three-dimensional point cloud image, the processor 22 is configured by the initial calibration module 36 to adjust the calibration parameters of the camera 14 and/or the LiDAR sensor 16.

The calibration parameters of the camera 14 and/or the LiDAR sensor 16 may include the yaw, pitch, roll, and/or position of the camera 14 and/or the LiDAR sensor 16. The camera 14 and/or LiDAR sensor 16 may include one or more actuators that allow the adjustment of the camera 14 and/or LiDAR sensor 16 to correspond with the calibration parameters provided to them.

The calibration parameters generated by the processor 22 by executing the instructions of the initial calibration module 36 may be considered to be an initial calibration. The purpose of the initial calibration may be to partially align the edges 23, 25, and 27 of the road signs 17, 19, and 21, respectively, captured in the camera image and the three-dimensional point cloud image. The fine-tuning of this alignment may be performed by the user as will be explained in the paragraphs that follow.

The user calibration module 38 includes instructions executed by the one or more processors 22 that cause the one or more processors 22 to display the combined image on the display device 26. In this example, the display device 26 may be located within the interior of the vehicle 10. The display device 26 may be part of the infotainment system of the vehicle 10. However, in an alternative example, the display device could be connected to an external device, such as a diagnostic computer 39 having a display device 42. The diagnostic computer 39 may take any one of several different forms and could be a traditional desktop or laptop computer, mobile device, tablet device, and the like. The diagnostic computer 39 may be connected to the processor 22 wirelessly or through a wired connection using one or more ports 40 that are in communication with the processor 22. The one or more ports may be an OBD-II port found on some vehicles.

The user calibration module 38 also includes instructions that cause the one or more processors 22 to receive at least one input from a user interface. In one example, the input device 24 allows the user to provide at least one input. The user interface may be incorporated within one or both of the input device 24 and/or the display device 26. For example, the input device 24 and the display device 26 may be combined in the form of a touchscreen. This touchscreen may be part of an infotainment system for a vehicle.

Alternatively, if a diagnostic computer 39 is utilized, the user interface may be displayed on the display device 42 of the diagnostic computer 39. The diagnostic computer 39 may include one or more input devices, such as a keyboard 46 and a pointing device 48. The input devices of the diagnostic computer 39 allow the user to provide inputs to the user interface.

The user calibration module 38 also includes instructions that when executed by the one or more processors 22 causes the one or more processors 22 to move the camera image and/or the three-dimensional point cloud image of the combined image in response to the inputs provided by the user. The movement or adjustment the camera image and/or three-dimensional point cloud image could include the adjustment or movement of the yaw, pitch, roll, and/or position of the three-dimensional point cloud image or the camera image of the combined image.

Based on the inputs provided by the user in moving the camera image and/or three-dimensional point cloud image, the user calibration module 38 causes the one or more processors 22 to adjust a calibration parameter of the LiDAR sensor 16 and/or the camera 14. The calibration parameter of either the camera 14 and/or LiDAR sensor 16 could include a yaw, pitch, roll, and/or position of the camera 14 and/or the LiDAR sensor 16. Thereafter, based on the calibration parameters, the camera 14 and/or LiDAR sensor 16 will be adjusted. As such, by allowing the user to adjust and provide inputs regarding the position of the camera image and/or three-dimensional point cloud image in the combined image, the system allows for the fine-tuning of the calibration of the camera 14 and/or LiDAR sensor 16 by the user.

Figure 3:
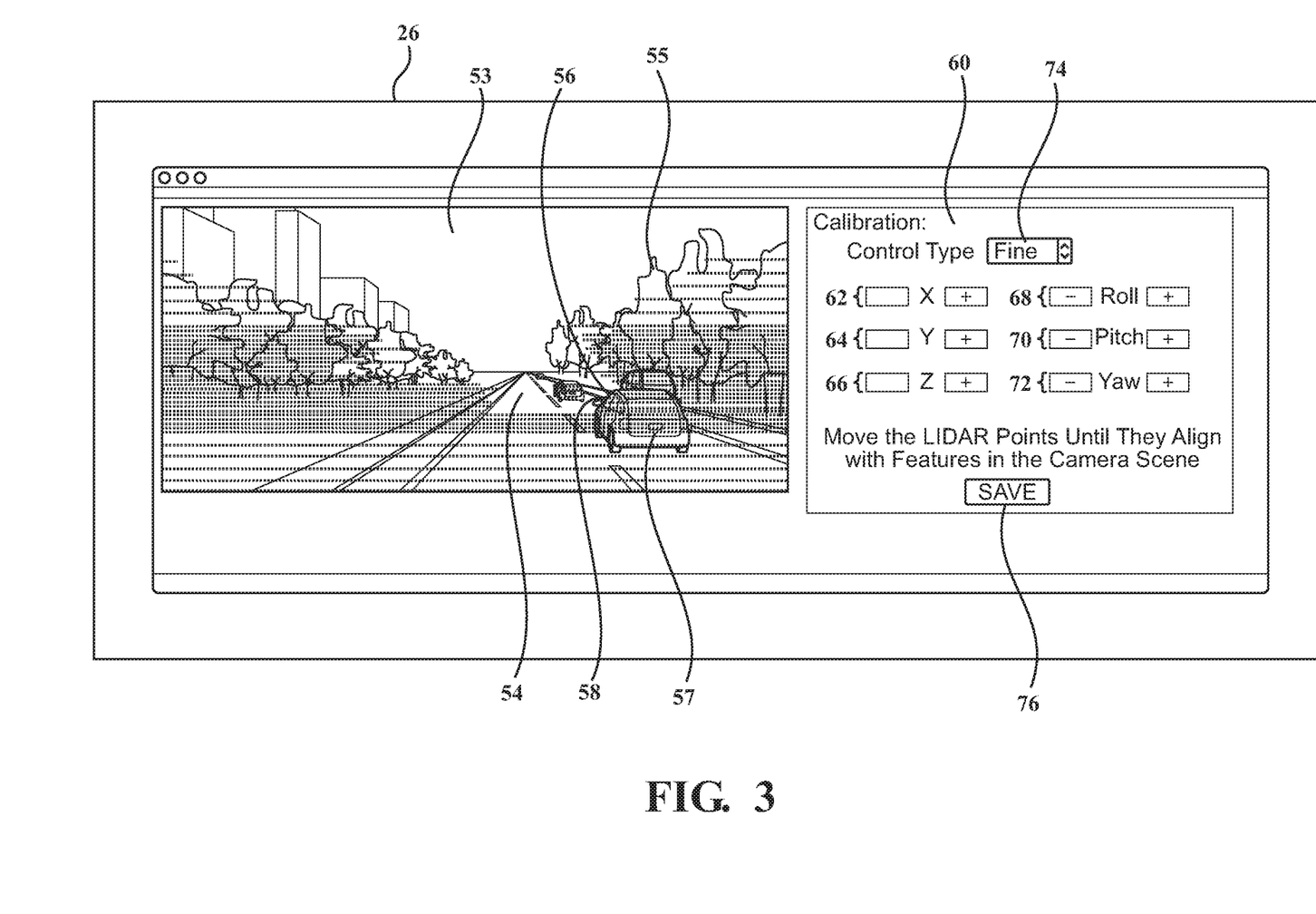
FIG. 3 illustrates a screenshot of a user interface for tuning the calibration parameters of either the at least one camera or LiDAR sensor.

Referring to FIG. 3, an example combined image 53 is shown. Here, the combined image 53 includes at least portions of the camera image 54 and the three-dimensional point cloud image 55. In this example, the combined image 53 has projected the three-dimensional point cloud image 55 onto the camera image 54. However, it should be understood that the combined image 53 could reverse the projection, that is, wherein the camera image 54 is projected onto the three-dimensional point cloud image 55.

In this example, the combined image 53 includes an object 57 in the shape of a vehicle. The object 57 includes an edge 56 in the three-dimensional point cloud image 55 and an edge 58 in the camera image 54. The initial calibration module 36 may cause the one or more processors 22 to attempt to substantially aligned the edges 56 and 58.

Also shown is a user interface 60. Here, the user interface allows a user to move the three-dimensional point cloud image 55 with respect to the camera image 54. Of course, it should be understood that the user interface may allow the opposite, wherein the user interface allows a user to move the camera image 54 with respect to the three-dimensional point cloud image 55. Additionally, it may also be possible that the user interface allows the user to move both the camera image 54 and the three-dimensional point cloud image 55 of the combined image 53.

The user interface 60 may include different types of controls to allow the movement of the image. Here, the user interface 60 may include controls 62, 64, and 66 for moving the position of the three-dimensional point cloud image 55 with respect to the X, Y, and Z directions, respectively. The user interface 60 may also include controls 68, 70, and 72 changing the roll, pitch, and yaw, respectively, of the three-dimensional point cloud image 55.

The user interface 60 may also allow for the adjustment of a control type using a drop-down menu 74. The control type may allow a finer or coarse control of the controls 62, 64, 66, 68, 70, and/or 72. As such, the control type allows the user to have the ability to fine-tune the position of the three-dimensional point cloud image 55 with respect to the camera image 54.

The user interface may also include a save button 76 that saves the adjustments of the controls 62, 64, 66, 68, 70, and/or 72 made by the user. These may be stored in the data store 32. The adjustments made by the user are then translated into calibration parameters for the camera 14 and/or LiDAR sensor 16.

Figure 4:
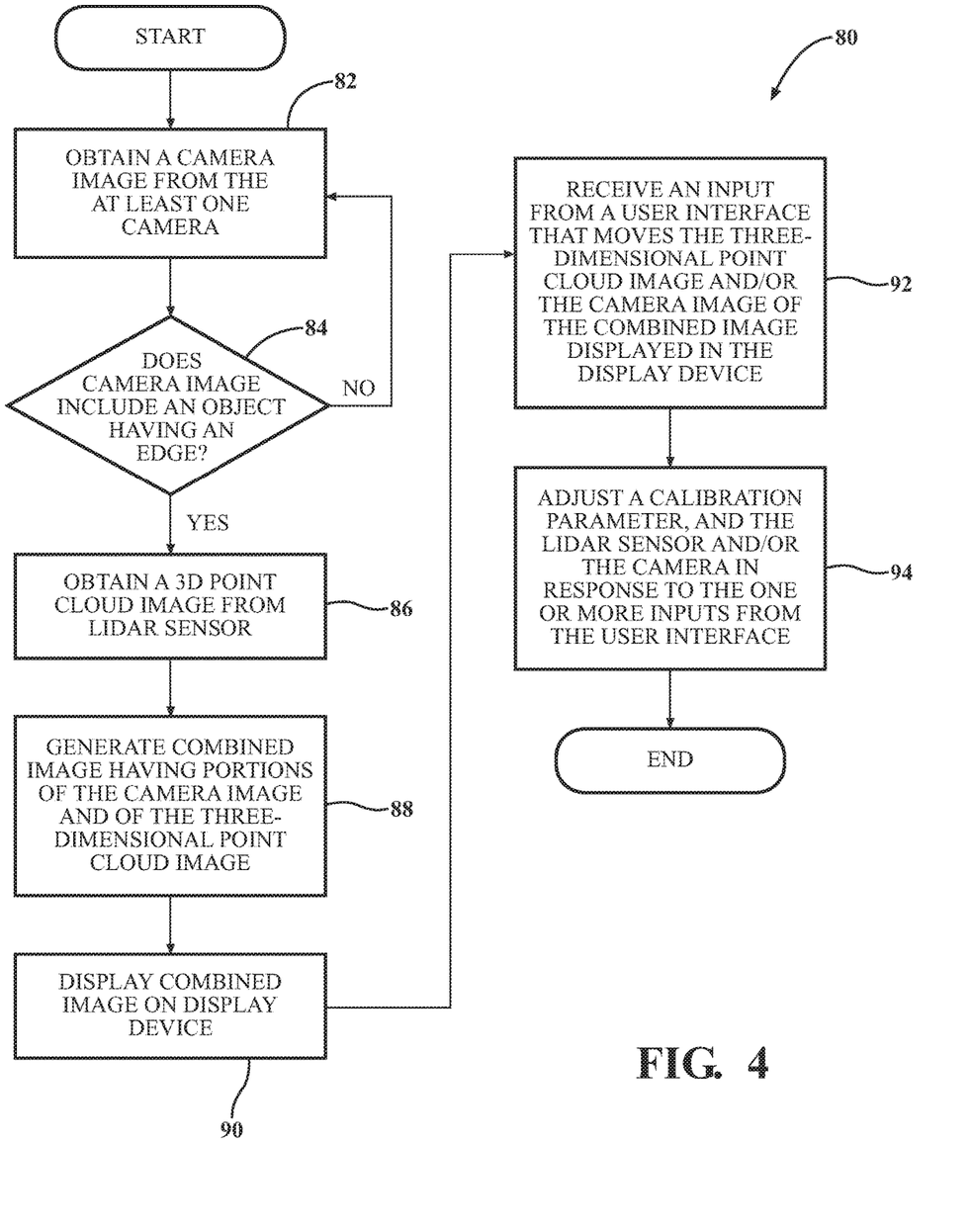
FIG. 4 illustrates a method for calibrating at least one camera and a LiDAR sensor.

Referring to FIG. 4, one example of a method 80 for calibrating at least one camera, such as camera 14, and/or a LiDAR sensor, such as LiDAR sensor 16 will be discussed from the perspective of the system 12 of FIGS. 1-2. While the method 80 is discussed in combination with the system 12, it should be appreciated that the method 80 is not limited to being implemented within the system 12 but is instead one example of a system that may implement the method 80.

The method 80 begins at step 82, wherein the initial calibration module 36 may obtain a camera image from the at least one camera, such as camera 14. In step 84, the initial calibration module 36 determines if the camera image previously captured by the camera 14 includes an object having an edge. If no object having an edge is detected, the method 80 returns to step 82. The requirements of at least one object may vary from application to application. For example, instead of requiring at least one object having at least one edge, the requirements could include finding at least three objects having at least three edges. Furthermore, the type of objects utilized could vary as well, such as a requirement that the objects be road signs.

In step 86, the initial calibration module 36 may obtain a three-dimensional point cloud image from a LiDAR sensor, such as LiDAR sensor 16. Thereafter, in step 88, the initial calibration module 36 may generate a combined image having portions of the camera image and portions of the three-dimensional point cloud image. Step 86 may also include some additional inquiries made by the initial calibration module 36. For example, the initial calibration module 36 may also count the number of objects captured in the camera image and the three-dimensional point cloud image. If the number of objects does not match, the method may return to step 82.

In step 90, the user calibration module 38 may display the combined image on the display device, such as display device 26. In step 92, the user calibration module may receive an input from a user interface that moves the three-dimensional point cloud image and/or the camera image of the combined image displayed in the display device. In this example, the inputs may be received from the input device 24.

In step 94, the user calibration module 38 may then adjust the calibration parameter of the LiDAR sensor 16 and/or the camera 14 in response to the inputs from the user interface. The calibration parameters of the LiDAR sensor 16 and/or the camera 14 may include a yaw, pitch, roll, and/or position of the LiDAR sensor 16 and/or the camera 14.

It should be appreciated that any of the systems described in this specification can be configured in various arrangements with separate integrated circuits and/or chips. The circuits are connected via connection paths to provide for communicating signals between the separate circuits. Of course, while separate integrated circuits are discussed, in various embodiments, the circuits may be integrated into a common integrated circuit board. Additionally, the integrated circuits may be combined into fewer integrated circuits or divided into more integrated circuits.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer readable program code embodied, e.g., stored, thereon. Any combination of one or more computer-readable media may be utilized. The computer-readable medium may be a computer readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a graphics processing unit (GPU), a CD, other optical medium, a RAM, a ROM, a memory chip or card, a memory stick, and other media from which a computer, a processor or other electronic device can read. In the context of this document, a computer-readable storage medium may be any tangible medium that can contain or store a program for use by or in connection with an instruction execution system, apparatus, or device.

The following includes definitions of selected terms employed herein. The definitions include various examples and/or forms of components that fall within the scope of a term, and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, may include one or more CMOS gates, combinations of gates, or other circuit components. Where multiple modules are described, one or more embodiments may include incorporating the multiple modules into one physical module component. Similarly, where a single module is described, one or more embodiments distribute the single module between multiple physical components.

Additionally, module, as used herein, includes routines, programs, objects, components, data structures, and so on that perform tasks or implement data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), as a graphics processing unit (GPU), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method for calibrating at least one camera and a light detection and ranging ("LiDAR") sensor, the method comprising:
   obtaining a camera image from the at least one camera;
   determining when the camera image includes at least one object having at least one edge;
   obtaining a three-dimensional point cloud image from the LiDAR sensor, wherein the three-dimensional point cloud image includes the at least one object having at least one edge;
   determining when a number of the at least one object in the camera image matches a number of the at least one object in the three-dimensional point cloud image;
   generating a combined image when the number of the at least one object in the camera image matches the number of the at least one object in the three-dimensional point cloud image, wherein the combined image includes at least portions of the camera image and at least portions of the three-dimensional point cloud image;
   displaying the combined image on a display;
   receiving at least one input from a user interface, the at least one input is configured to move at least one of the three-dimensional point cloud image and the camera image of the combined image displayed in the display; and
   adjusting a calibration parameter of at least one of the LiDAR sensor and the at least one camera in response to the one or more inputs from the user interface.

2. The method of claim 1, wherein the combined image is generated by projecting the three-dimensional point cloud image into the camera image to form a combined image.

3. The method of claim 1, wherein the combined image is generated by projecting the camera image into the three-dimensional point cloud image.

4. The method of claim 1, wherein the at least one object is at least one road sign.

5. The method of claim 1, further comprising the step of adjusting a calibration parameter of at least one of the LiDAR sensor and the at least one camera so that the at least one edge of the at least one object of the camera image is substantially aligned with the at least one edge of the at least one object of the three-dimensional point cloud image in the combined image.

6. The method of claim 1, wherein the at least one input of the user interface adjusts at least one of a yaw, a pitch, a roll and a position of at least one of the three-dimensional point cloud image and the camera image of the combined image.

7. The method of claim 1, wherein the calibration parameter includes at least one of a one of a yaw, a pitch, a roll and a position of at least one of the at least one camera and the LiDAR sensor.

8. The method of claim 1, wherein the at least one camera and LiDAR sensor are mounted to a vehicle.

9. A system for calibrating at least one camera and a light detection and ranging ("LiDAR") sensor, the system comprising:
   one or more processors;
   a memory in communication with the one or more processors, the memory storing:
      an initial calibration module having instructions that when executed by the one or more processors cause the one or more processors to:
         obtain a camera image from the at least one camera,
         determine when the camera image includes at least one object having at least one edge, obtain a three-dimensional point cloud image from the LiDAR sensor, wherein the three-dimensional point cloud image includes the at least one object having at least one edge, determine when a number of the at least one object in the camera image matches a number of the at least one object in the three-dimensional point cloud image, and generate a combined image when the number of the at least one object in the camera image matches the number of the at least one object in the three-dimensional point cloud image, wherein the combined image includes at least portions of the camera image and at least portions of the three-dimensional point cloud image; and a user calibration module having instructions that when executed by the one or more processors cause the one or more processors to:

display the combined image on a display, receive at least one input from a user interface, the at least one input is configured to move at least one of the three-dimensional point cloud image and the camera image of the combined image displayed in the display, and adjust a calibration parameter of at least one of the LiDAR sensor and the at least one camera in response to the one or more inputs from the user interface.

10. The system of claim 9, wherein the combined image is generated by the initial calibration module by projecting the three-dimensional point cloud image into the camera image to form a combined image.

11. The system of claim 9, wherein the combined image is generated by the initial calibration module by projecting the camera image inot the three-dimensional point cloud image.

12. The system of claim 9, wherein the at least one object is at least one road sign.

13. The system of claim 9, wherein the initial calibration module further includes instructions that when executed by the one or more processors cause the one or more processors to adjust a calibration parameter of at least one of the LiDAR sensor and the at least one camera so that the at least one edge of the at least one object of the camera image is substantially aligned with the at least one edge of the at least one object of the three-dimensional point cloud image in the combined image.

14. The system of claim 9, wherein the at least one input of the user interface adjusts at least one of a yaw, a pitch, a roll and a position of at least one of the three-dimensional point cloud image and the camera image of the combined image.

15. The system of claim 9, wherein the calibration parameter includes at least one of a one of a yaw, a pitch, a roll and a position of at least one of the at least one camera and the LiDAR sensor.

16. The system of claim 9, wherein the at least one camera and LiDAR sensor are mounted to a vehicle.

17. A non-transitory computer-readable medium for calibrating at least one camera and a light detection and ranging ("LiDAR") sensor and including instructions that when executed by one or more processors cause the one or more processors to:

obtain a camera image from the at least one camera;

determine when the camera image includes at least one object having at least one edge;

obtain a three-dimensional point cloud image from the LiDAR sensor, wherein the three-dimensional point cloud image includes the at least one object having at least one edge;

determine when a number of the at least one object in the camera image matches a number of the at least one object in the three-dimensional point cloud image;

generate a combined image when the number of the at least one object in the camera image matches the number of the at least one object in the three-dimensional point cloud image, wherein the combined image includes at least portions of the camera image and at least portions of the three-dimensional point cloud image;

display the combined image on a display;

receive at least one input from a user interface, the at least one input is configured to move at least one of the three-dimensional point cloud image and the camera image of the combined image displayed in the display; and adjust a calibration parameter of at least one of the LiDAR sensor and the at least one camera in response to the one or more inputs from the user interface.

18. The non-transitory computer-readable medium of claim 17, further including instructions that when executed by one or more processors cause the one or more processors to adjust a calibration parameter of at least one of the LiDAR sensor and the at least one camera so that the at least one edge of the at least one object of the camera image is substantially aligned with the at least one edge of the at least one object of the three-dimensional point cloud image in the combined image.

* * * * *